No. 740,487. PATENTED OCT. 6, 1903.
F. P. THOMAS.
CAR BRAKE.
APPLICATION FILED JUNE 1, 1903.
NO MODEL. 2 SHEETS—SHEET 2.

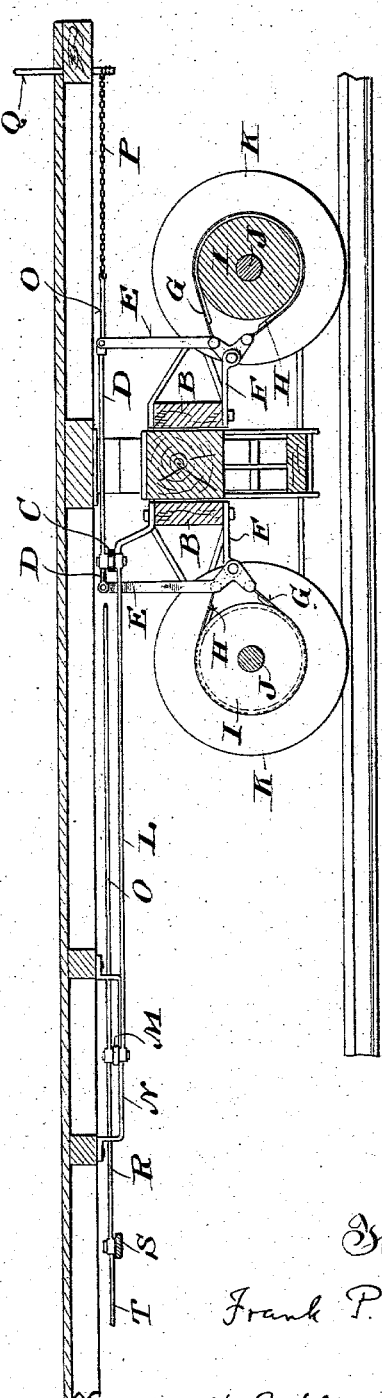

Witnesses:
Geo. W. Young
N. E. Oliphant

Inventor:
Frank P. Thomas
By H. G. Underwood
Attorneys

No. 740,487. Patented October 6, 1903.

UNITED STATES PATENT OFFICE.

FRANK P. THOMAS, OF RACINE, WISCONSIN, ASSIGNOR OF THREE-FIFTHS TO ANTHONY KRAGNIK AND CHARLES KRAGNIK, OF RACINE, WISCONSIN.

CAR-BRAKE.

SPECIFICATION forming part of Letters Patent No. 740,487, dated October 6, 1903.

Application filed June 1, 1903. Serial No. 159,407. (No model.)

*To all whom it may concern:*

Be it known that I, FRANK P. THOMAS, a citizen of the United States, and a resident of Racine, in the county of Racine and State of Wisconsin, have invented certain new and useful Improvements in Car-Brakes; and I do hereby declare that the following is a full, clear, and exact description thereof.

The improvements consist in certain peculiarities of construction and combination of parts hereinafter particularly set forth with reference to the accompanying drawings and subsequently claimed, the object of the invention being to provide simple, economical, powerful, and durable car-brake mechanism that can be readily applied with but slight manual exertion or by other means.

Figure 3:
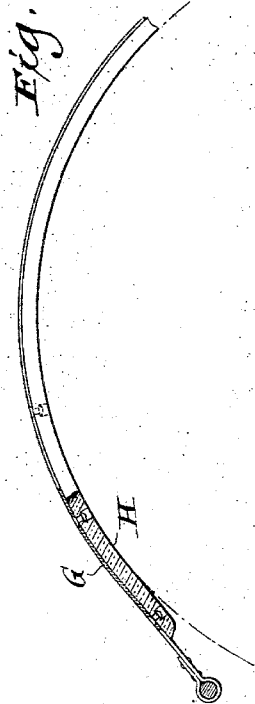
Figure 2:
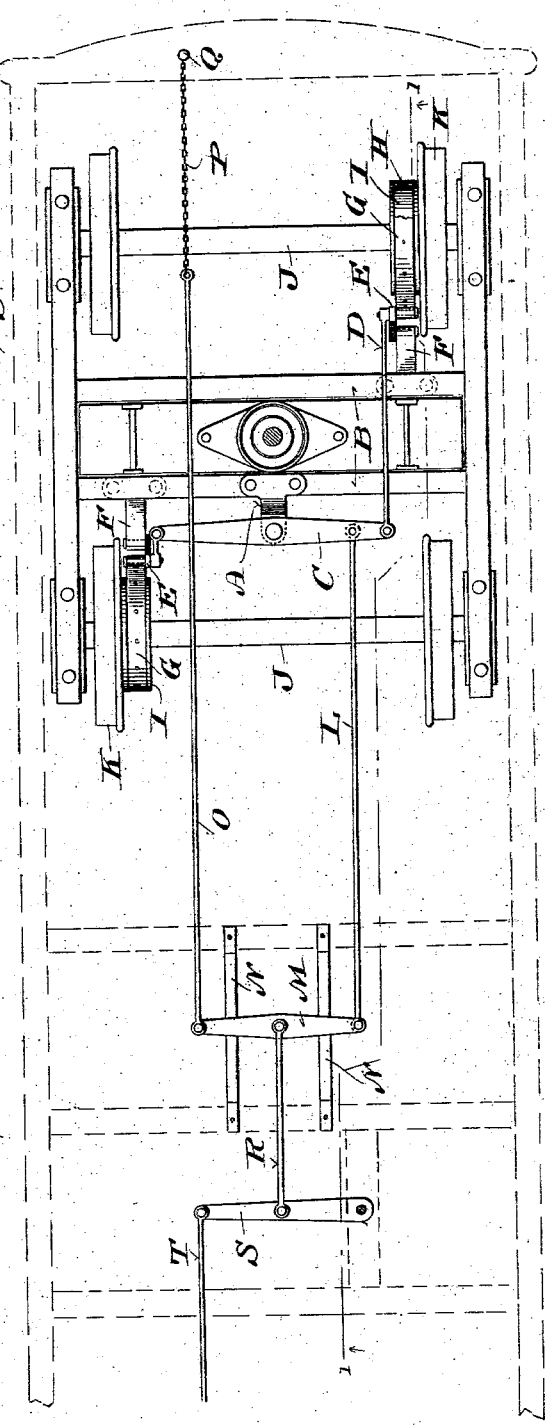
Figure 4:
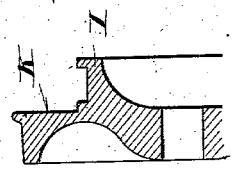

Figure 1 of the drawings represents a sectional view of a portion of a railway-car and one of its trucks provided with brake mechanism in accordance with my invention, this view being indicated by lines 1 1 in the second figure; Fig. 2, a plan view of the truck and brake mechanism; Fig. 3, a detail partly-sectional view of a brake-band, and Fig. 4 a partly-sectional view of a truck-wheel provided with an inner lateral axle-collar having a recessed periphery for engagement of a brake-band.

Referring by letters to the drawings, A indicates a bracket made fast to one of the cross-beams B of a railway-car truck of ordinary construction. A horizontal yoke C is centrally pivoted to the bracket A, and the ends of this yoke are coupled by links D with vertical levers E, having cranked lower ends in fulcrum connection with horizontal brackets F, attached to the aforesaid beams, these brackets being extended in opposite directions.

Coupled to the cranked lower ends of the levers F are the ends of brake-bands that are each preferably a spring-steel strap G, having a lining H, of fiber material, held thereto by rivets having countersunk heads, as shown in Fig. 3. Each brake-band engages a peripheral recess of a collar I, that is rigid on a truck-axle J, each collar being preferably an inner lateral projection of a truck-wheel K, integral therewith, and swing of the yoke C operates on levers F to tighten the brake-bands on the collars of both truck-axles.

The yoke C is shown connected by a link-rod L with one end of a floating lever M, for which supporting-brackets N are suspended from the car-frame, and the other end of this floating lever is shown coupled to a brake-rod O, flexibly connected by a chain P with a stem Q at one end of the car, this stem being turned by hand to set the brake. It is also practical to employ means in connection with the aforesaid yoke for utilizing atmospheric air to set the brakes. The yoke is also shown connected by a link-rod R with a lever S, fulcrumed to the aforesaid car, and coupled to this lever is a link-rod T for connection with the brake-yoke pertaining to another truck, whereby the brake-bands of both trucks may be set from one end of said car. The yoke pertaining to each truck being oscillative in connection with the levers E, there is automatic conformity of the entire brake mechanism to the travel of said truck on track-curves, whereby friction of the brake-bands is sometimes prevented and at other times held at the proper even tension, accordingly as said bands are slack or set.

Having thus described my invention, what I claim as new, and desire to secure by Letters Patent, is—

1. The combination of a railway-truck having wheels thereof provided with integral friction-collar projections, levers in fulcrum connection with the truck-frame, collar-fitting brake-bands connected at their ends to the levers, a lever-connecting yoke having central pivotal connection with said truck-frame, and means for actuating the yoke.

2. The combination of a railway-truck having friction-collars that turn with its wheels on the same axes, levers in fulcrum connection with the truck-frame, collar-fitting brake-bands connected at their ends to the levers, a lever-connecting yoke having central pivotal connection with said truck-frame, a floating lever connected to said yoke, and means for actuating the floating lever.

3. The combination of a railway-truck having friction-collars that turn with its wheels on the same axes, levers in fulcrum connection with the truck-frame, collar-fitting brake-bands controlled by said levers, a lever-connecting yoke having central pivotal connection with said truck-frame, a floating lever connected to the yoke, means for actuating the floating lever, and another lever coupled to said floating lever for connection with the brake-yoke of another truck.

In testimony that I claim the foregoing I have hereunto set my hand, at Racine, in the county of Racine and State of Wisconsin, in the presence of two witnesses.

FRANK P. THOMAS.

Witnesses:
MATHEW STARKE,
HENRY HARTOUR.